United States Patent
Froment et al.

(10) Patent No.: US 9,280,234 B1
(45) Date of Patent: Mar. 8, 2016

(54) INPUT CORRECTION FOR TOUCH SCREENS

(71) Applicant: Amazon Technologies, Inc., Reno, NV (US)

(72) Inventors: Arnaud Marie Froment, San Jose, CA (US); Nadim Awad, San Francisco, CA (US); Kenneth Paul Kiraly, Menlo Park, CA (US)

(73) Assignee: AMAZON TECHNOLOGIES, INC., Reno, NV (US)

( * ) Notice: Subject to any disclaimer, the term of this patent is extended or adjusted under 35 U.S.C. 154(b) by 246 days.

(21) Appl. No.: 13/926,617

(22) Filed: Jun. 25, 2013

(51) Int. Cl.
  *G06F 3/041* (2006.01)
  *G06F 3/0488* (2013.01)
  *G06F 3/044* (2006.01)

(52) U.S. Cl.
  CPC .............. *G06F 3/0418* (2013.01); *G06F 3/041* (2013.01); *G06F 3/044* (2013.01); *G06F 3/0416* (2013.01); *G06F 3/0488* (2013.01); *G06F 3/04883* (2013.01)

(58) Field of Classification Search
  USPC .................................................. 345/173, 178
  See application file for complete search history.

(56) References Cited

U.S. PATENT DOCUMENTS

| | | | |
|---|---|---|---|
| 6,621,473 B2 * | 9/2003 | Lai et al. | 345/32 |
| 2005/0116938 A1 * | 6/2005 | Ito et al. | 345/173 |
| 2005/0134575 A1 * | 6/2005 | Kim | 345/173 |
| 2008/0150909 A1 * | 6/2008 | North et al. | 345/173 |
| 2010/0013780 A1 * | 1/2010 | Ikeda et al. | 345/173 |
| 2010/0079501 A1 * | 4/2010 | Ikeda | G06F 3/0485 345/661 |

* cited by examiner

*Primary Examiner* — Jason Olson
*Assistant Examiner* — Sosina Abebe
(74) *Attorney, Agent, or Firm* — Seyfarth Shaw LLP; Ilan N. Barzilay; Cyrus A. Miller

(57) ABSTRACT

A system and method determines whether a finger touch on a touch screen device is outside the defined boundary of a touch target. In such situations a device may adjust the location coordinates of the finger touch to adaptively correspond to an appropriate touch target based on such factors as context, region, distance from touch target, user history, device movement, parallax, etc. The method and system may also be applied to overlapping touch targets.

21 Claims, 10 Drawing Sheets

INPUT CORRECTION FOR TOUCH SCREENS

BACKGROUND

With the advancement of technology, the use of electronic devices with touch-enabled user interfaces is becoming more prevalent. In general, the touch screen of an electronic device includes a user interface that provides elements defining touchable target areas for interaction with a user. When the user touches a target area, various actions and re-actions of the user interface are triggered to control the electronic device.

BRIEF DESCRIPTION OF DRAWINGS

For a more complete understanding of the present disclosure, reference is now made to the following description taken in conjunction with the accompanying drawings.

DETAILED DESCRIPTION

In touch screen enabled electronic devices, the touch screen often displays a graphical user interface which includes icons or other graphical elements with which a user may interact. Many icons are touchable by a user to operate the device such as engaging with an application, playing a game, launching a new application, altering a display, etc. These touchable elements of a user interface (UI) may be referred to as UI elements. A UI element may be a graphical element, textual element, or other element. Each UI element may be associated with a touch target, which is a defined area on the touchable screen that, when touched by a user, activates a particular action associated with the respective UI element. A touch target corresponds generally (but may not correspond exactly due to shape and other constraints) to the graphical area of its associated UI element. If a user touches the screen within the touch target, an action associated with the UI element is then triggered by the underlying computing processes of the device. In some instances, however, a person may touch the screen and may miss activating the UI element because the touch does not occur within a predefined touch target. When designing the user interface, an additional boundary area, extending around the UI element (e.g., button), may be defined, thereby extending the touchable area of a UI element and reducing the likelihood of the user missing the target. This, however, can be limiting and time consuming if a programmer has to manually define the area around each UI element displayed on a touchscreen.

To address these concerns, the present disclosure offers a method and system to adjust, in real time, touches occurring from a received user input for touch screens and other hand-activated devices. The system and methods disclosed herein are directed to analyzing touch inputs and determining whether a finger touch is intended for a particular UI element based on the context associated with the user and/or device as it is being used. The context may include a variety of factors, such as a user's interaction history with a device or application, whether a user is right-handed or left-handed, importance of nearby UI elements, whether the device is moving at the time the screen is touched, whether the device is being held at an angle relative to the user when the screen is touched, or other factors as explained below. If the system determines the finger touch is outside of a touch target, the system can adjust the coordinates of the touch input or otherwise adjust the touch processing to associate the touch input with a touch target.

Figure 1:
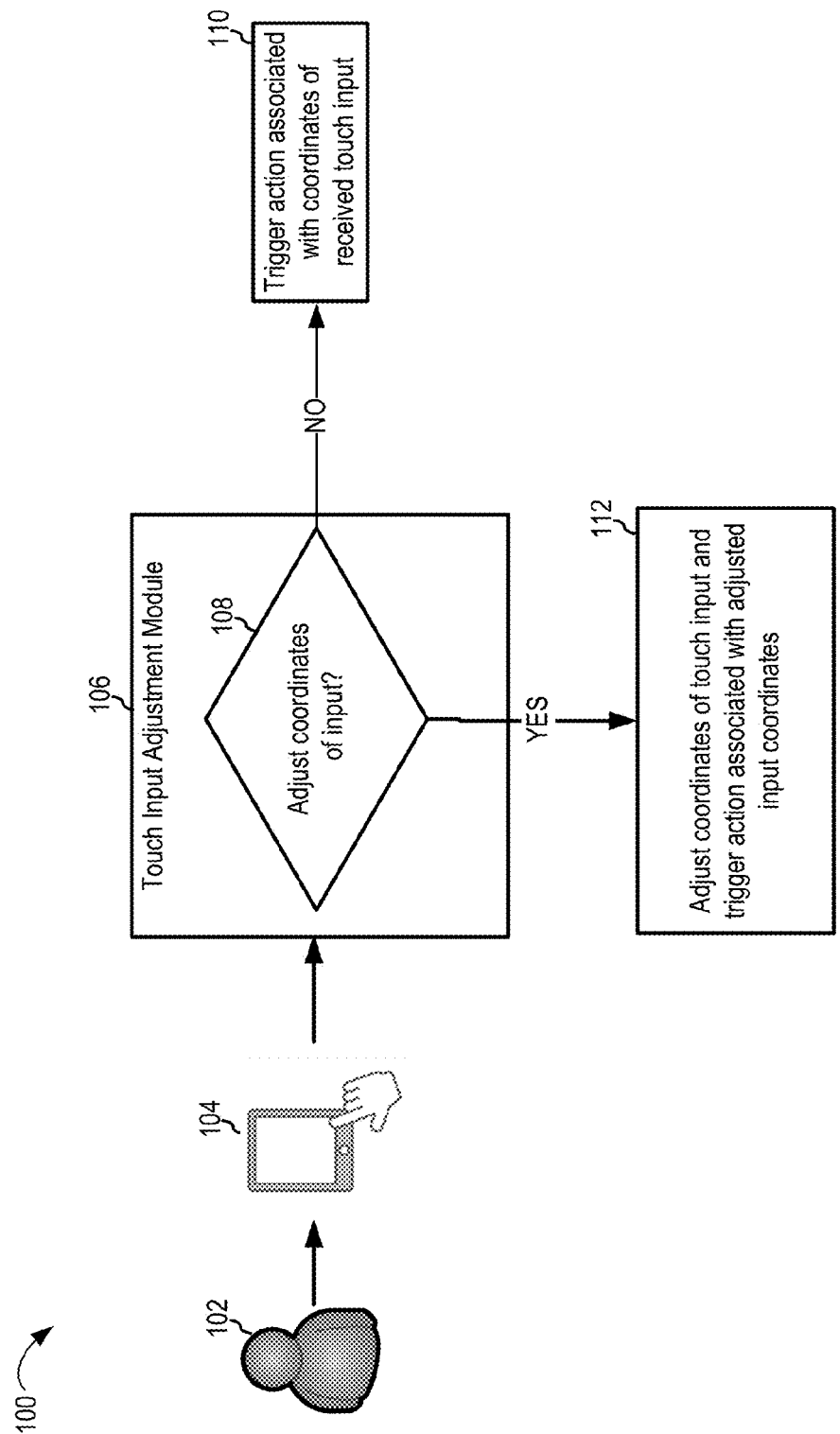
FIG. 1 provides a pictorial diagram of a method and system for adaptively adjusting user touch inputs.

FIG. 1 illustrates an exemplary implementation of the system and method. A user 102 may interact with an electronic device 104. The electronic device 104 includes a touch screen displaying touchable targets, such as buttons, lists, scroll bars, check boxes, text areas, etc., which may be touched by the user 102. When the user touches the screen and is detected by the electronic device 104, a touch input occurs. The electronic device 104 associates location coordinates of the touch screen with the detected user touch input. A touch input adjustment module 106 analyzes the touch input and the context of the touch input and is configured to determine, at box 108, whether to adjust the coordinates of the detected touch input. In particular, the touch input adjustment module 106 determines whether the location coordinates of the detected touch input are within the boundaries of a defined touch target and then determines whether to adjust the coordinates of the touch input (and what to adjust them to) based on the context of the touch input. If the touch input adjustment module 106 determines that the coordinates of the touch input fall outside the boundaries of a touch target, the coordinates may be adjusted, in box 112. The adjusted coordinates may then trigger an action or reaction for controlling the electronic device 104 associated with the touch target. Optionally, the touch input adjustment module 106 may determine the coordinates of the touch input fall within a defined touch target and may decide not to adjust coordinates. In box 110, the coordinates associated with the originally received touch input triggers an associated action.

According to aspects of the present disclosure, the touch input adjustment module 106 analyzes the touch input and considers the coordinates of the touch input and/or the coordinates of the centroid (i.e., general center) of the touch input. As explained below, the touch input adjustment module 106 may also consider contextual factors of the touch input, such as the user's behavior, the direction of the touch progression, the finger size of the user, and/or whether the user is left-handed or right-handed. The touch input adjustment module 106 may also consider the user interface with which the user is interacting, the relative position of UI elements to each other, relative historical use of UI elements and overall user history. The touch input adjustment module 106 also considers other contextual aspects, for example, the meaningfulness of a target and how likely a target, such as a button, is to be pressed in a given context. The touch input adjustment module 106 may also consider and adjust for the effects of parallax on the detected user input. Based on the above considerations the touch input adjustment module 106 may skew the touch input toward a closer target that was intended to be touched by the user.

Figure 2:
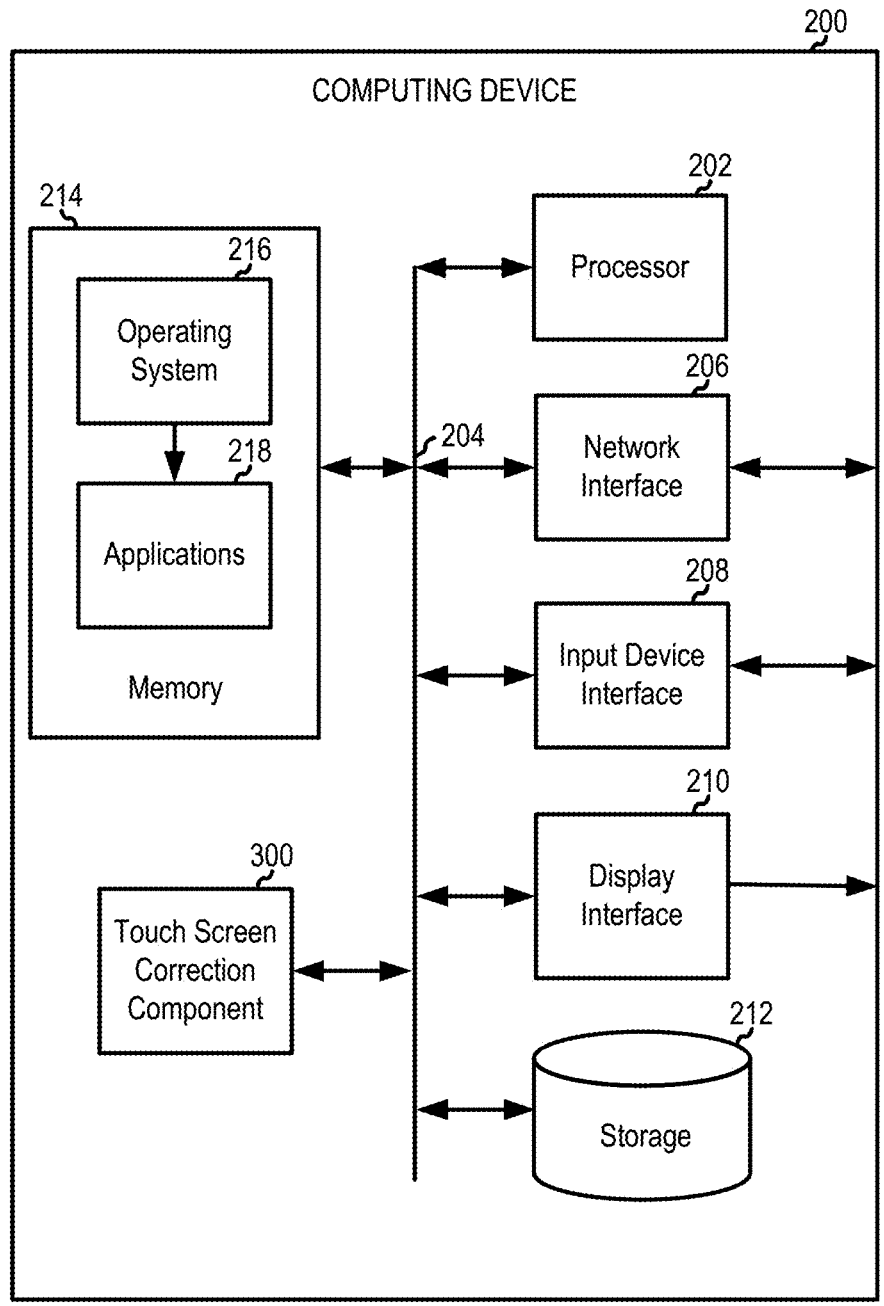
FIG. 2 is a block diagram conceptually illustrating a computing device according to one aspect of the present disclosure.

Aspects of the present disclosure may be implemented as a computer implemented method in a computing device or computer system. FIG. 2 illustrates an exemplary computing device 200. The computing device 200 may include a processor 202 in communication with a variety of other components over a system bus 204 or through a direct connection. These other components may include, for example, a network interface 206, an input device interface 208, a display interface 210, and a storage database 212. As appreciated by those skilled in the art, the network interface 206 enables the computing device 200 to communicate data, control signals, data requests, and other information with other resources including computers, data sources, storage devices, and the like, on a computer network such as the Internet. The network interface 206 may be configured to communicate via wired or wireless connections.

The processor 202 may be configured to operate in accordance with programming instructions stored in a memory 214. The memory 214 generally comprises RAM, ROM, and/or other memory. Thus, in addition to storage in read/write memory (RAM), programming instructions may also be embodied in read-only format, such as those found in ROM or other non-volatile memory. The memory 214 may store an operating system 216 for controlling the operation of the computing device 200. The operating system may be a general purpose operating system such as a Microsoft Windows operating system, a UNIX operating system, a Linux operating system, or an operating system specifically written for and tailored to the computing device 200. Similarly, the memory 214 may also store user-executable applications 218, or programs, for conducting various functions on the computing device 200. For example, the application 218 in memory 214 may be configured according to aspects of the present disclosure to process or analyze touch inputs received from a user via a touch screen.

The input device interface 208, sometimes also embodied as an input/output interface, enables the computing device 200 to obtain data input from a variety of devices including, but not limited to, a touch screen, a digital pen, a keyboard, a mouse, a scanner, camera, microphone, and the like. In addition to the exemplary components described above, a display interface 210 may be used for outputting display information to a computer user. Typically, the display information is output by the display interface 210 via a display device (e.g., a monitor or similar device). While not illustrated, one skilled in the art should appreciate that a display device may be incorporated as an integral element within a computing device 200 or may be separate therefrom. The display interface 210 may include a touch screen and touch screen interface. As one skilled in the art should appreciate, the computing device 200 may detect a user touch input via a touch screen display, analyze the touch input and determine whether to adjust, in real time, the coordinates associated with the detected touch input.

When a user interacts with a touch screen the device captures the coordinates of the center of the (roughly elliptical) touched area but may also capture a variety of other information such as the touch pressure at a given coordinate, a pressure map showing the pressure of a touch over the entire touched area, a time of a touch input, a duration of contact between the user and the touchscreen (which may be a duration for the entire touch input or may be different durations for different points of contact of the touch input), direction of movement of a touch input (such as, for example, a sliding touch), a touch radius, which may reflect the touch ellipse on multiple axes to give a more detailed representation of the user's touch, etc. Using this captured touch-based information, along with contextual information about the application (s) running and the device usage, as well as user information such as user history, physical angle of the user relative to the device, right or left hand preference, finger size, etc., the device may perform touch adjustment to assign errant screen touches, such as touches that are do not fall within defined boundaries of a particular touch target, to potential intended targets.

As described below, aspects of the present disclosure are directed to a method and system that determines whether a touch input is outside the defined boundary of a touch target, and if it is, can adjust the location coordinates of the touch input to adaptively correspond to an appropriate touch target based on such factors as context, region, distance from touch target, etc. The method and system may also be applied to overlapping touch targets. Additionally, a touch adjustment feature may also be applied to correct for parallax. In particular, defined areas or extended regions of touch targets may be swayed based on the viewing angle of the user. If the user is holding a device one way and looking at screen at a certain angle, the angle at which parallax will occur may be determined. The touch boundaries may then be adjusted (upwards/downwards or sideways) to account for the viewing angle and parallax affect.

Figure 3:
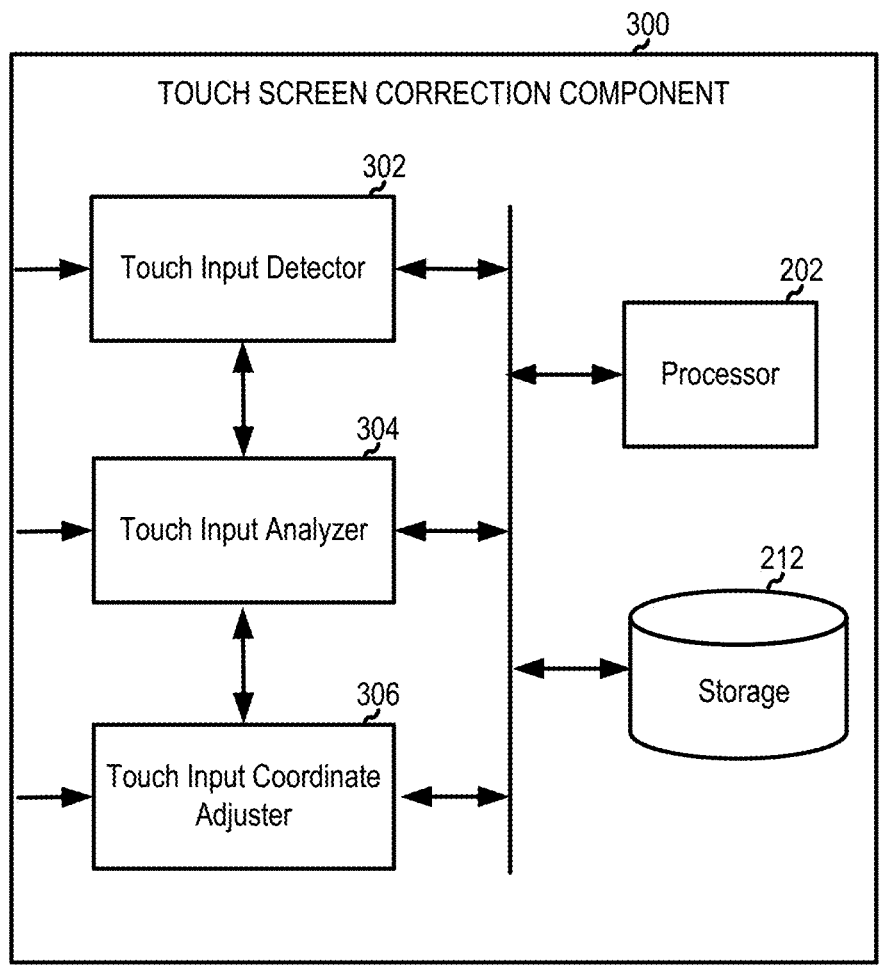
FIG. 3 is a block diagram conceptually illustrating an adaptive touch input adjustment system according to one aspect of the present disclosure.

A touch input adjustment component suitable for adjusting, in real time, detected touch inputs may be implemented in an application or module implemented on the computing device 200, in a plurality of cooperating applications/modules on the computing device 200, or in a plurality of cooperating applications and/or modules distributed over multiple computing devices 200 in a computer network, for example. Components of the touch input adjustment system may be identified with regard to various logical components. FIG. 3 is a block diagram illustrating logical components of a touch input adjustment system 300 for adjusting touch inputs in real time. As illustrated in FIG. 3, the touch input adjustment system 300 includes one or more touch input detectors 302, one or more touch input analyzers 304, and one or more touch input coordinate adjusters 306. Further, for illustrative purposes, the touch input adjustment system 300 includes the processor 202 and storage database 212.

Figure 4A:
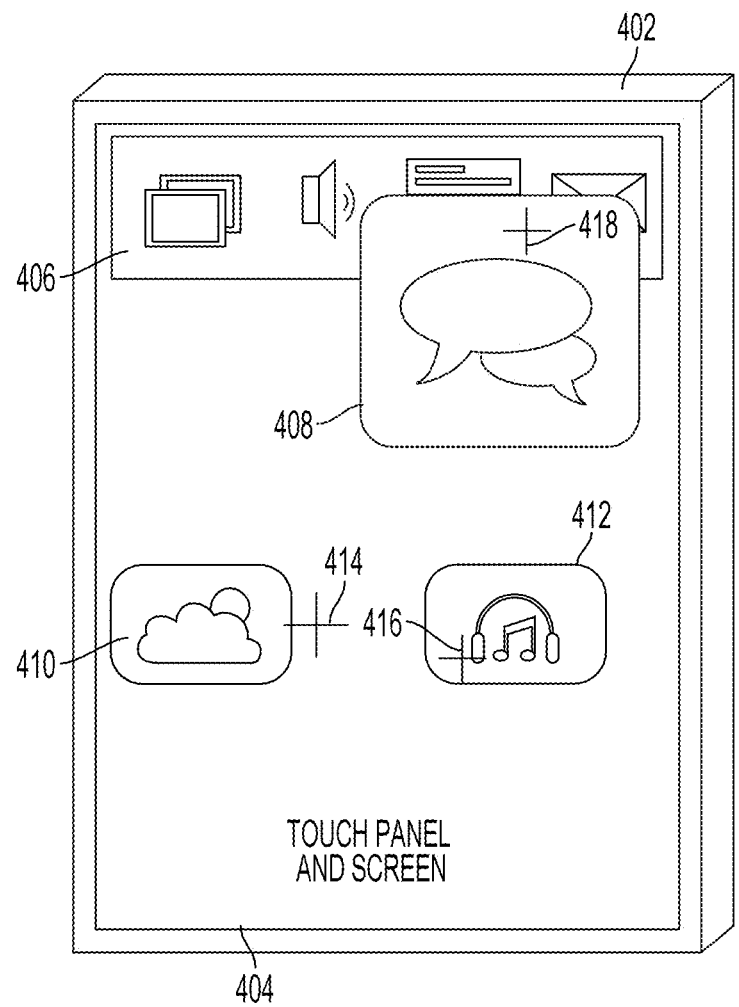
FIG. 4A illustrates icons of a user interface according to one aspect of the present disclosure.

FIG. 4A is an example illustration of an electronic device 402 displaying various UI elements on a touch screen 404. UI elements may be represented in many forms, for example, standard buttons, lists, scroll bars, check boxes and text areas. In some scenarios, a UI element may be more or less difficult to touch by the user, depending on the size of the UI element, its proximity to other nearby UI elements, whether the UI element moves (such as in a game), whether the device itself is moving, etc. FIG. 4A illustrates four UI elements. UI element 406 is a toolbar that, when touched by a user brings the user to another screen with further options. UI element 410 is an icon that, when touched, launches a weather application. UI element 412 is an icon that, when touched, launches a music application. UI element 408 represents a pop-up icon for a text message application that may include the text of an incoming message. When a user touches UI element 408, the text message application is launched.

Figure 4B:
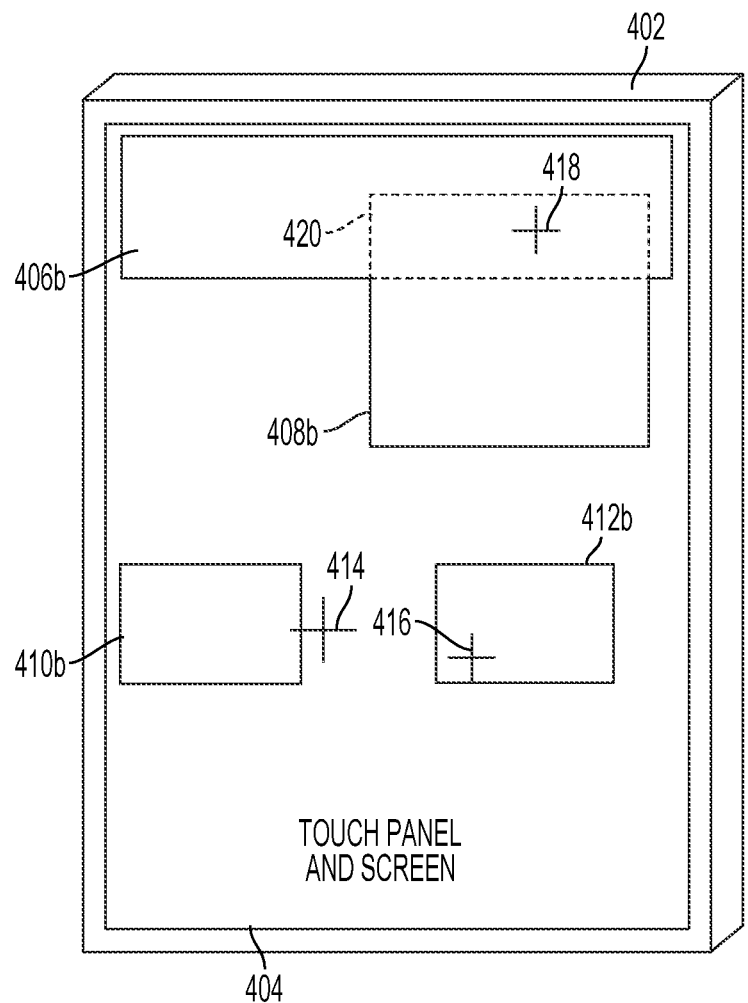
FIG. 4B illustrates touch targets corresponding to icons of a user interface according to one aspect of the present disclosure.

When a device detects a touch input on a touch sensor, the touch input is associated with coordinates of contact with the touch sensor, sampled at a sub-seconds rate to the order of the tens of milliseconds. The coordinates may correspond to the entire touched area, to the centroid of the touched area, to the most heavily pressed portion of the touched area, etc. Different touch inputs may be more or less easy for a system to associate with a UI element depending on where the touch inputs occur and the context of the touch inputs. Take, for example, touch inputs 414, 416 and 418 as shown in FIG. 4A. The touch inputs are represented by a cross, indicating the center of the touch input as detected by the device. The touch inputs are also shown in FIG. 4B. FIG. 4B illustrates the same touch screen as FIG. 4A only with the UI elements 406, 408, 410 and 412 replaced with their respective touch targets 406b, 408b, 410b and 412b. Touch target 406b represents the boundary of touch screen coordinates associated with UI element 406. Thus, in a typical touch screen device, if a touch input falls within touch target 406b, it will be associated with UI element 406 and if a touch input falls outside touch target 406b, it will not be associated with UI element 406. Similarly touch target 410b is associated with UI element 410 and touch target 412b is associated with UI element 412. As touch input 416 is within touch target 412b, touch input 416 may be assigned to UI element 412 without much difficulty. In a traditional device, touch input 414, which falls between touch target 410b and touch target 412b, would not be associated with either UI element 410 or UI element 416 as the touch input falls outside the touch targets of both UI elements. In the present system, however, the device may analyze the context of the touch input 414 to determine whether it should be associated to a particular UI element.

Touch input 418 may be difficult to assign as touch input 418 falls within portion 420 which overlaps with touch target 406b and touch target 408b. When the centroid coordinates of a touch input 418 land within the overlapping portion 420, various logic and/or other rules may be applied to determine whether to trigger an action associated with touch target 408 and/or touch target 406. Such logic may include z-order logic which involves certain processing to determine which target among the stack of touch targets (stacked along the z-axis perpendicular to the plane of the screen, hence the name z-order logic) should be associated with the touch input. As disclosed herein, whether to associate touch input 418 with UI element 406 or 408 may also depend on the context of the touch input, such as how soon after the pop-up UI element 408 appeared on the screen 404, how likely the user is to check an incoming text message within a certain time window, the user's history of accessing the toolbar 406 under similar conditions to those of the touch input 418, etc.

Touch targets may be defined in a number of ways. A touch target may be defined by an explicit perimeter, such as those illustrated in FIG. 4B. Alternatively, a touch target may be defined by its corners, with the system extrapolating the borders of the touch target based on those corners. Touch targets may also be defined as a region within a certain radius of a single point. Touch targets may be defined as a pixel map, specifically identifying the pixels to be associated with the touch target. Touch targets may be regular shapes such as a rectangle, oval, etc. or may be irregularly shaped, with different angles and lines defining the target. Touch targets may be the same size or different size than a respective associated UI element, but this may vary across devices and applications.

To assist with associating touch inputs to UI elements, in one aspect of the present disclosure, a touch target may be represented by a set of characteristics that include the touchable area defined by the touch target, but may also include an area defined by mathematical functions that may define an adjustable extendable region around the boundary of the touchable area. As described below, this extendable region may be used to associate a touch input with a touch target, even when the touch input is outside the traditional defined area of the touch target.

Figure 5:
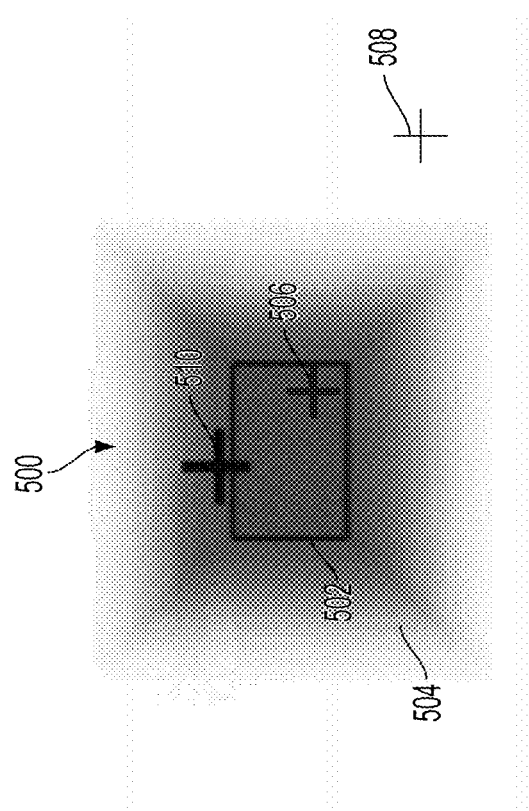
FIG. 5 illustrates an exemplary magnetic map applied to a touch target according to one aspect of the present disclosure.

FIG. 5 illustrates an example extendable region that may be applied to a touch target. In particular, the touch target 500 includes a defined boundary area 502 and an extended region 504 surrounding the touchable area 502. The extended region 504 is shaded, with the darker area closer to the defined boundary area 502 and the lighter area farther away from the defined boundary area 502. This shading generally represents the variable likelihood that a particular touch input in the extendable region 504 will be associated with the touch target 500, with a touch input in the darker regions more likely to be associated with the touch target 500. The defined boundary area 502 may be the region within which a touch input is assigned a fixed likelihood that the touch input should be associated with the touch target 500, thus skipping the variable likelihood calculations of the extended region. The fixed likelihood initially assigned for touch inputs within the defined boundary area may, however, be later adjusted based on factors such as context of the touch input, whether the touch input also falls within a defined boundary area or extended region of another touch target, etc. The defined boundary area 502 may also be referred to as an inner region to differentiate between the defined boundary area and the extended region. The extended region may be defined by a mathematical function with assigns a likelihood based on a non-linear function of the distance between a touch input and a touch target. The likelihood of a particular touch input being associated with a touch target may be represented by a hit-score.

In one example, the centroid coordinate of a given touch input is evaluated and given a hit-score for one or more defined touch targets displayed on the user interface. The given hit-score indicates the likelihood that a touch input was meant to trigger a particular touch target. For example, in one aspect, a hit-score of one (1) may indicate the touch input was very likely intended to trigger an action associated with that particular UI element. Further, a hit-score of zero (0) may indicate the touch input was probably not intended to trigger an action associated with that particular UI element. Scores between 0 and 1 may also be assigned, representing relative likelihoods that the touch should be associated with the particular touch target. Referring back to FIG. 5 for an illustrative example, when the centroid coordinate is within the boundary of the defined boundary area 502 of the touch target 500, the hit-score is set to a value of one (e.g., hit-score=1.0). When the centroid coordinate of a touch input 508 is outside the boundary of the defined boundary area 502, and if the distance between the centroid coordinate and the closest point on the boundary of the touchable target is larger than a certain distance, called X, then hit-score is set to a value of zero (e.g., hit-score=0.0).

When the centroid coordinate of a touch input 510 is outside the boundary of the touchable area 502, and if the distance d between the centroid coordinate and the closest point on the boundary of the defined box of the touchable area 502 is less than X, then the hit-score may be set to $(X-d)/X$, where the hit-score is associated a function $f(d)=(X-d)/X$. Those skilled in the art will appreciate other functions, including more complex functions, may be associated with the touch targets.

Referring back to FIG. 5, the touch input 506 falls within the boundary of the touchable area 502 and will trigger an action associated with the touch target 500. Additionally, the touch input 510 falls within the extended region 504. When the adjusted hit-scoring is applied, the hit-score of the touch input 510 is not zero because it is within the extended region 504. In one example, the hit-score may be a value of 0.9, and the touch input 510 may then trigger an action associated with the touch target 500. Touch input 508, however, may still be assigned a hit-score of 0 for touch target 500 as it is beyond the defined boundary of the touchable area 502 and beyond the extended region 504. In one aspect, the hit-score may be determined based on a non-linear relationship between the location of the touch input and the location of the defined touchable area. For example, a hit-score may be based on the square of a distance between the touch input and defined touchable area, thus creating a greater sensitivity closer to the borders of the defined touchable area. Other non-linear relationships may also be configured.

Figure 6A:
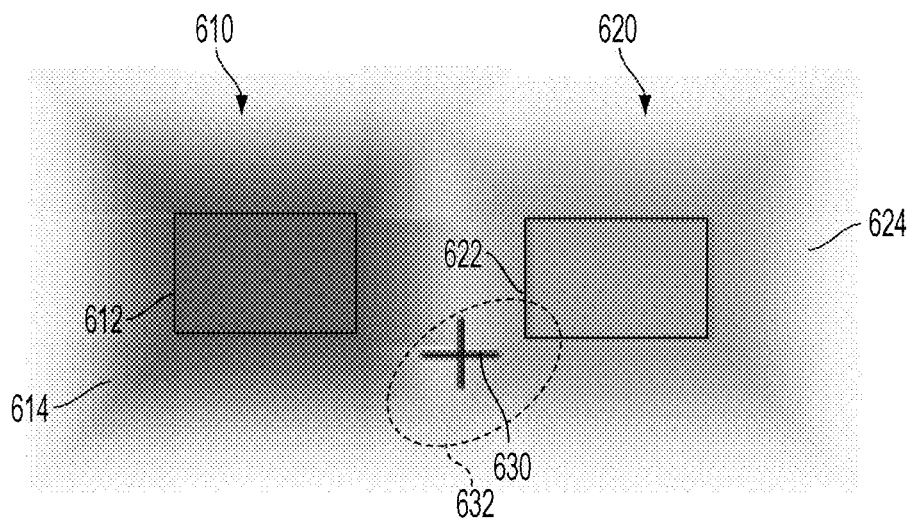
FIGS. 6A and 6B illustrate exemplary extended regions applied to multiple touch targets according to one aspect of the present disclosure.
Figure 6B:
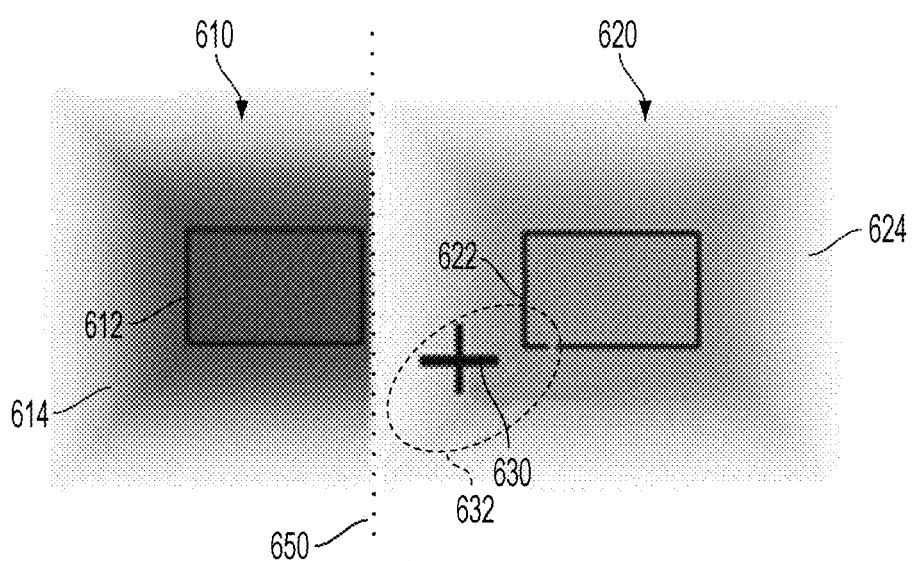

The above system of employing extended regions may also applied to multiple touch targets appearing on a screen at the same time. When multiple extended regions are active simultaneously, depending on the placement of the original defined touch targets and their associated extended regions, certain extended regions may overlap. FIGS. 6A and 6B illustrate the application of an example adjustable touch map applied to a touch target 610 and a touch target 620 appearing on a screen at the same time. As shown in FIG. 6A, the touch target 610 includes a defined boundary area 612 and an extended region 614. The touch target 620 includes a defined boundary area 622 and an extended region 624. As illustrated, the touch targets 610 and 620 have overlapping extended regions. If a touch input is located in the overlapping portion of the extended regions (and thus not within the defined boundaries of either touch target), additional processing may be performed, such as that described below, to determine which touch target should be associated with the touch input.

In one aspect, a hit-score function may be associated to a touch target may take into account UI contextual information, such as the relative positioning of other touch targets. For example, a non-linear function may be used for touch targets that overlapped, with the distance of the touch input to the respective defined touch areas of nearby touch targets incorporated in the function. The function may assign the touch input different hit-scores to the different nearby touch targets. The touch target with the highest hit score may be associated to the touch input. For example, touch input 632 (with center 630) may be assigned a hit-score for touch target 610 (with defined boundary area 612) and a different hit-score for touch target 620 (with defined boundary area 622). In another aspect illustrated in FIG. 6B, a strict finite boundary may be constructed between the overlapping extended regions. In this aspect if a touch input fell on side of the boundary, the touch input may be associated with the closest touch target boundary area. For example, a strict boundary 650 may be drawn such that any touches to the right of the boundary (such as touch input 632) will be associated with touch target 620.

In one aspect, a hit-score function may incorporate touch input context information. For example, a perimeter of a touch input, such as touch input perimeter 632 may be considered when determining the hit-score. In the illustrated example, because the perimeter of touch input 632 crosses the defined boundary 622, touch target 620 may be more heavily weighted for determining the score of touch input 632. Other factors, such as a touch input's shape and the direction a finger may have been headed when the touch input occurred. Such a direction may be determined from information such as the user's tendency to use a right or left and information from a device's camera or other sensors, etc. The hit-score function may incorporate the orientation of the touch input, such as the orientation of the ellipses of touch input 632 facing touch target 620, as well as other geometric properties such as the major and minor radii of the ellipse 632.

Once the hit-scores are calculated and the system has determined the proper touch target to associate with a touch input, the system may perform that association in a number of ways. In one aspect the system may dynamically adjust the touch input centroid coordinates so that the adjusted coordinates fall within the defined bounds of the touch target itself. The adjusted coordinates may then be forwarded to device applications and other upper layers which will in turn process the touch input as if it fell in the adjusted coordinates (i.e., within the defined boundaries of a touch target). Alternately, the system may forward to applications and upper layers the original centroid coordinates. The system may then be modified so that the action callback associated with the highest hit-score touch target is activated.

Figure 7A:
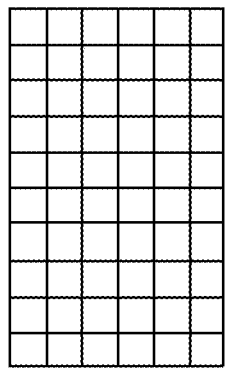
FIGS. 7A and 7B are diagrams illustrating the parallax effect.

In another aspect, to reduce the amount of computation triggered by a touch input, the system decomposes the screen into a grid. In one example, the grid is configured as a linear matrix of similarly sized rectangular cells defined by dividing the screen into column and rows as illustrated in FIG. 7A. The screen may also be divided into other shaped cells, such as squares, hexagons, etc. For each cell, the system then pregenerates hit-scores for each touch target whose zone of influence (which includes the target's defined boundary and extended region) overlaps with the particular cell. In this manner, when a touch input occurs, a lookup table is utilized to access the pre-generated hit scores and compare the hit-scores of targets in touched cells to determine the highest-hit score touch target for the touch input. The system may then associate the touch input with the highest scoring touch target. Alternatively, pre-generated hit-scores may be generated so that a touch target is associated with each cell of the screen, allowing for quick selection of a touch target for each touch input.

The system may also stack grids and associate a distinct grid to each window of a screen, including a lower level root window. Compared to a single screen-associated grid, this provides for various different grid characteristics (size, pitch, coarseness, etc.) on a per-window basis. This method may be utilized to reduce computations by the system by tailoring the grid coarseness to the density and size of touch targets. For example, a fine grid with small cells may be applied to a group of numerous small touch targets and a course grid with larger cells applied to a window with few large touch targets.

Context information may also include information regarding the angle a user is holding a device when a touch input occurs. Thus, in another aspect, adaptive adjustment techniques are applied to correct for the parallax effect that occurs when a user is holding a touch screen device at an angle. Such a viewing angle may result in a user touching the screen at a location that is slightly different from the location of the device's touch sensor corresponding to the intended touch location of the user. This effect is illustrated in FIG. 8.

Figure 8:
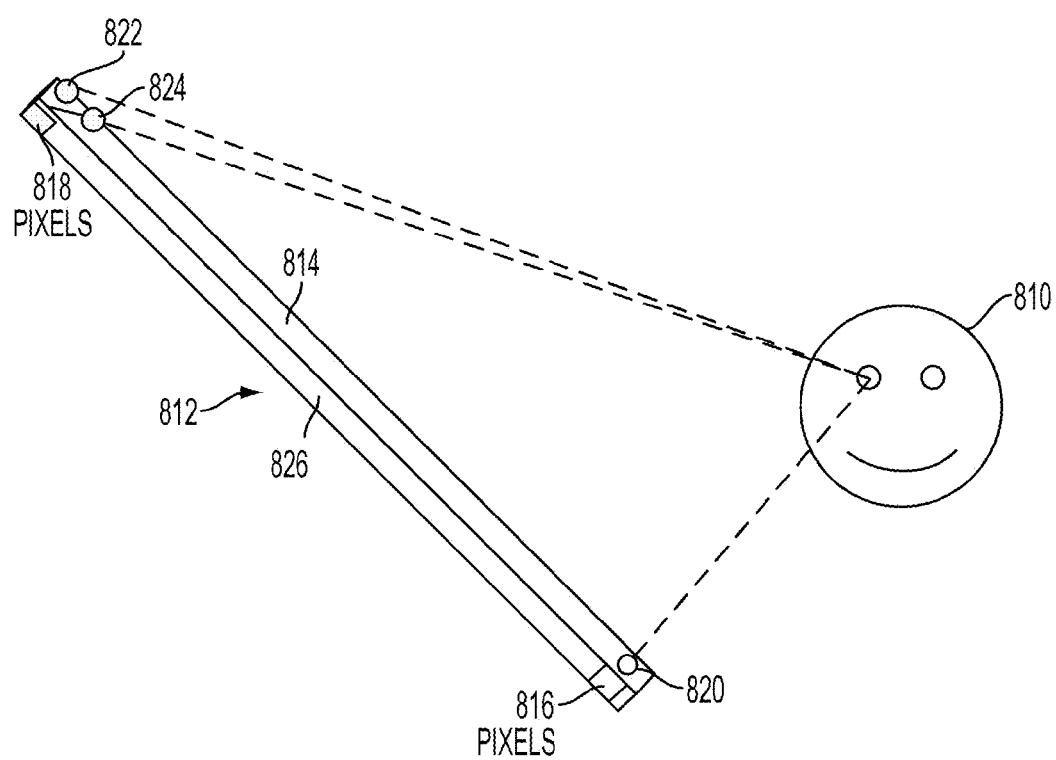
FIG. 8 is a diagram illustrating a same-size cell grid and an example anamorphic grid for correct parallax according to one aspect of the present disclosure.

FIG. 8 shows a user 810 holding and using a touch screen device 812. The device 812 includes a pixel 816 and a pixel 818 as displayed on the display layer 826 of the device. The display layer is covered by the protective glass and touch layer 814. Because the user's eye is closest to the bottom of the device 812, the eye of the user 810 properly sees the pixel 816 at a location 820 on the display. Thus, when the user 810 touches the pixel 816 at location 820, the coordinates of the touch, as measured on the touch layer 814 correspond to the coordinates of the pixel 816. In contrast, due to the angle of the tablet 812 in relation to the eye of the user 810, a pixel on the far end of the device, such as pixel 818, may be viewed at a skewed location. In particular, the position of the pixel 818 corresponds to a location 822 on the touch layer 814. However, due to the angle of viewing and the parallax effect, the user may instead view the pixel 818 to be positioned at a location 824 on the touch layer 814. Accordingly, when the user attempts to touch the pixel 818, the user is likely to touch the touch layer at the incorrect location 824 rather than the location 822.

In one aspect, the system is configured to determine context information about the position of the user's eyes and fingers relative to the physical position and orientation of the screen. This information may be determined using a variety of components and sensors such as device camera(s), speaker and microphone, distance sensor(s), gyroscope, infrared sensors, capacitive sensors, pressure sensors, etc. For example, the relative positioning of the user's eyes compared to the display of the tablet 812 is determined. In particular, the azimuth angle of the line of sight of the user 810 is compared to the touch layer 814 as well as the distance between the user's eyes and the screen. The characteristics of the screen stack (thickness of display panel, thickness of touch panel, thickness of protective layers, etc.) are then adjusted to adapt the coordinates of the user touches. Accordingly, when the user 810 touches the location 824 on the touch layer 816, the touch driver may correct the touch to report a touch on the position 822 instead, or otherwise correct for the incorrect touch location.

Figure 7B:
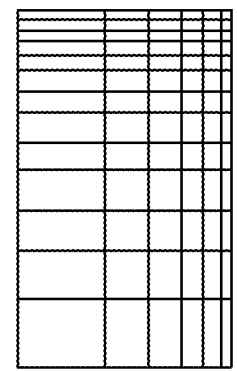

In another aspect, a grid may be constructed (and adjusted) based on the user's angle relative to the device. The grid may account for the parallax effect and create cells on the screen corresponding to the user's viewing angle. An example of such a grid is shown in FIG. 7B. The grid may be associated with certain hit-scores for overlapping touch targets as described above. In another aspect, extended regions of touch targets, such as extended regions 504, 614 and 624 illustrated in FIGS. 5 and 6, may be dynamically configured based on an angle of a device resulting in asymmetrical extended regions surrounding touch target boundaries.

Various other contextual factors in addition to the location of a touch input may also be considered to determine a hit-score and which touch target was the intended target. The actual location of a screen touched (as opposed to simply the center of a touch input) may be considered. For example, referring again to FIG. 6A, the area 632 represents the actual contact area of a user finger with the touch screen panel. The fact that the contact area is overlapping the touch target 620, but not the touch target 610 may be considered. Additionally, the amount of surface area common to the touch target and to the actual contact area may be factored in the analysis, either absolutely or in a function of both or either the surface area of the contact and the size of touch target itself. The pressure gradient of a touch input may also be considered. For example, if a touch has significantly higher pressure closer to a first touch target than a second, the hit-scores for each touch target may be adjusted. The system may also be configured to determine the angle of approach of the touching finger and whether the device was moved suddenly prior to the finger making contact with the screen. The system may also consider the time elapsed between appearance of the UI element and the touch input to determine whether a user intended to activate the particular UI element at the time of the touch input. The device may use this information to correct the coordinates of the touch input and associate the touch input with an originally intended touch target.

A user's behavior history, including touch tendencies and touch history, may also be considered when analyzing the context of a touch input and determining a hit-score. For example, a user may exhibit "miss tendencies" where they frequently miss a touch target by a certain region in a certain direction. The device may compensate for those tendencies by adjusting touch input coordinates and/or a grid configuration based on the user tendencies. In another example, if a user is left-handed or right-handed, individual touch inputs and/or a screen grid configuration may be adjusted to compensate, such as for a left-handed individual's tendency to tap buttons on a left side or a right-handed individual's tendency to tap buttons on a right side. A device may also compensate for a user's finger size or manual dexterity (such as correcting for a shaking finger which may cause multiple nearby touch inputs in a relatively short time frame). In another example, a user's previous interactions with a user interface may be considered to determine whether a touch input corresponds with typical user behavior. If the touch input is unusual for the user, but is located close to where a user typically touches in a particular situation, the device may consider the touch history when determining the correct touch target to associate with the touch input. Similarly, if a user typically activates a particular application during a particular time of day (or day of the week, etc.) and the time of the touch input corresponds with such a user tendency, a hit-score for a touch target associated with the particularly application's UI element may be adjusted accordingly. These various factors, as well as others, may be used to adjust individual coordinates of touch inputs relative to touch targets. The various factors may also be used to adjust a grid associated with a screen to compensate for any of the various factors discussed. The various factors may also be used to configure the shape and density of extended touch regions surrounding touch boundaries.

The context of the device may also be considered when determining a hit-score associating particular touch inputs to particular touch targets. For example, if a device is moving when a touch input is received, the movement of the device may be considered. Specifically, if a touch input is located just to the side of a particular touch target and the device registered a sudden movement just before the touch input, based on the movement of the device as recorded by the device components, the system may determine that the touch input would have been located within the particular touch target had the device not suddenly moved and may thus increase a hit-score for the touch input with the particular touch target.

Figure 9:
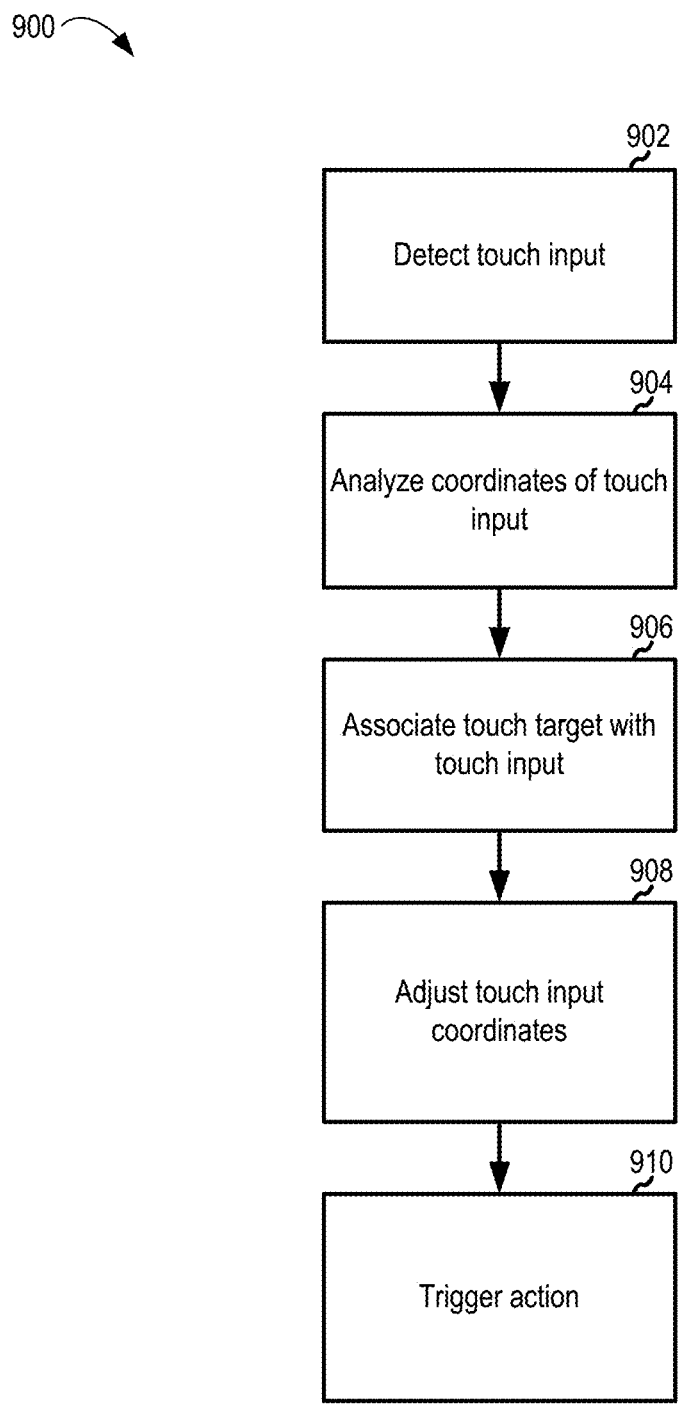
FIG. 9 is a flow diagram of a method and system for adjusting received touch inputs from a user according to one aspect of the present disclosure.

FIG. 9 is a flow diagram illustrating an exemplary routine 900 for determining whether to adjust, in real time, the coordinates associated with a detected touch input, using, for example, one or more of the logical components of FIG. 3. In block 902, a touch input is detected when, for example, a touch input is received from a user. The coordinates associated with the touch input are analyzed in block 904. In block 906, the touch input is associated with an identified touch target. The touch input is adjusted, in block 908, when the coordinates of the touch input fall outside the boundary of the identified touch target. In block 910, an action associated with the identified touch target is triggered.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. For example, the detection techniques described herein may be applied to many different languages and types of textual works. Persons having ordinary skill in the field of computers, digital imaging, and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the present disclosure may be implemented as a computer implemented method, a system, or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid state memory, flash drive, removable disk, and/or other media.

Aspects of the present disclosure may be performed in different forms of software, firmware, and/or hardware. Further, the teachings of the disclosure may be performed by an application specific integrated circuit (ASIC), field programmable gate array (FPGA), or other component, for example.

Aspects of the present disclosure may be performed on a single device or may be performed on multiple devices. For example, program modules including one or more components described herein may be located in different devices and may each perform one or more aspects of the present disclosure. As used in this disclosure, the term "a" or "one" may include one or more items unless specifically stated otherwise. Further, the phrase "based on" is intended to mean "based at least in part on" unless specifically stated otherwise.

What is claimed is:

1. A method of associating touch inputs on a touch screen device to displayed user interface elements, the method comprising:
    identifying an inner region of a touch target corresponding to a user interface element displayed on a screen of the touch screen device, wherein an area of the inner region corresponds to pixels of the displayed user interface element;
    identifying an extended region of the touch target, wherein the extended region extends beyond the inner region of the touch target;
    detecting a touch input on the screen;
    determining that a center of the touch input is outside the inner region but within the extended region;
    determining a viewing angle of the screen relative to a user;
    determining, using the viewing angle and the touch input, a potential location of the touch input had the viewing angle been different;
    determining a distance between a center of the touch input and the potential location;
    calculating a score for the touch input based at least in part on the distance and based at least in part on a context of the touch input, wherein the score represents a likelihood that the touch input should be associated with the touch target; and
    associating the touch input with the touch target based at least in part on the score.

2. The method of claim 1, wherein the context of the touch input comprises one or more of a user behavior history, a movement of the touch screen device at a time of the touch input or a time elapsed between appearance of the user interface element and the touch input.

3. The method of claim 1, wherein the associating comprises altering coordinates of the touch input to be within the inner region of the touch target.

4. The method of claim 1, wherein the touch input is between an extended region and inner region of a second touch target, and further comprising calculating a second score for the touch input wherein the second score represents a likelihood that the touch input should be associated with the second touch target and wherein the associating further comprises determining the second score is lower than the score.

5. The method of claim 1, further comprising:
    determining the viewing angle of the touch screen device relative to the user based on inputs from one or more of a gyroscope of the device, a distance sensor of the device, an infrared sensor of the device, a microphone of the device or a capacitive sensor of the device.

6. A method comprising:
    identifying a region of a touch target, the region overlapping at least in part with a user interface element displayed on a touch screen of a touch screen device;
    detecting a touch input on the touch screen;
    identifying coordinates of the touch input;
    determining that the coordinates are outside of the region;
    determining a viewing angle of the touch screen relative to a user;
    determining, using the viewing angle and the coordinates, a potential location of the touch input had the viewing angle been different;
    determining a distance between the coordinates and the potential location; and
    associating the touch input with the touch target based at least in part on the distance.

7. The method of claim 6, wherein the associating is based at least in part on a context of the touch input and wherein the context of the touch input comprises one or more of a user behavior history, a movement of the touch screen device at a time of the touch input or a time elapsed between appearance of the user interface element and the touch input.

8. The method of claim 6, wherein the region is an inner region and the coordinates are outside of the inner region but within an extended region of the touch target.

9. The method of claim 8, further comprising calculating a score for the touch input, wherein the score is based at least in part on a distance from the coordinates of the touch input to the inner region of the touch target and wherein the associating is based at least in part on the score.

10. The method of claim 8, further comprising calculating a second score for the touch input wherein the second score is based at least in part on a distance from the coordinates of the touch input to an inner region of a second touch target and wherein the associating is further based at least in part on the second score.

11. The method of claim 6, wherein the associating comprises altering the coordinates of the touch input to be within the region of the touch target.

12. The method of claim 6, wherein the associating is further based at least in part on a distance between a touch layer of the touch screen device and a display layer of the touch screen device.

13. The method of claim 6, further comprising:
    determining, prior to detecting the touch input, a grid for the touch screen based on the viewing angle, wherein the grid divides the touch screen into columns and rows, and a height of the rows and a width of the columns is based on the viewing angle;
    generating a hit-score for a cell in the grid, wherein the hit-score indicates a likelihood that the cell is associated with the touch target;
    storing the hit-score, and wherein the coordinates are within the cell and the associating is further based at least in part on the hit-score.

14. A computing device, comprising:
   at least one processor;
   a touch screen;
   a memory device including instructions operable to be executed by the at least one processor to perform a set of actions, configuring the at least one processor:
   to identify a region of a touch target, the region overlapping at least in part with a user interface element displayed on the touch screen;
   to detect a touch input on the touch screen;
   to identify coordinates of the touch input;
   to determine that the coordinates are outside of the region;
   to determine a viewing angle of the touch screen relative to a user;
   to determine, using the viewing angle and the coordinates, a potential location of the touch input had the viewing angle been different;
   to determine a distance between the coordinates and the potential location; and
   to associate the touch input with the touch target based at least in part on the distance.

15. The computing device of claim 14, wherein the at least one processor is configured to associate is based at least in part on a context of the touch input and wherein the context of the touch input comprises one or more of a user behavior history, a movement of the computing device at a time of the touch input or a time elapsed between appearance of the user interface element and the touch input.

16. The computing device of claim 14, wherein the region is an inner region and the coordinates are outside of the inner region but within an extended region of the touch target.

17. The computing device of claim 16, wherein the at least one processor is configured to calculate a score for the touch input, wherein the score is based at least in part on a distance from the coordinates of the touch input to the inner region of the touch target and wherein the at least one processor is configured to associate based at least in part on the score.

18. The computing device of claim 16, wherein the at least one processor is configured to calculate a second score for the touch input wherein the second score is based at least in part on a distance from the coordinates of the touch input to an inner region of a second touch target and wherein the at least one processor is further configured to associate based at least in part on the second score.

19. The computing device of claim 14, wherein the at least one processor is configured to associate by altering the coordinates of the touch input to be within the region of the touch target.

20. The computing device of claim 14, wherein the at least one processor is configured to associate further based at least in part on a distance between a touch layer of the touch screen and a display layer of the touch screen.

21. The computing device of claim 14, wherein the at least one processor is configured to:
   determine, prior to detecting the touch input, a grid for the touch screen based on the viewing angle, wherein the grid divides the touch screen into columns and rows, and a height of the rows and a width of the columns is based on the viewing angle;
   generate a hit-score for a cell in the grid, wherein the hit-score indicates a likelihood that the cell is associated with the touch target;
   store the hit-score, and
   wherein the coordinates are within the cell and the associating is further based at least in part on the hit-score.

* * * * *